United States Patent [19]
Fuhr et al.

[11] Patent Number: 5,191,000
[45] Date of Patent: Mar. 2, 1993

[54] FLAMEPROOFED, NON-DRIPPING POLYALKYLENE TEREPHTHALATE MOLDING COMPOUNDS

[75] Inventors: Karl Fuhr, Krefeld; Friedemann Müller, Neuss; Karl-Heinz Ott, Leverkusen, all of Fed. Rep. of Germany

[73] Assignee: Bayer Aktiengesellschaft, Leverkusen, Fed. Rep. of Germany

[21] Appl. No.: 697,988

[22] Filed: May 10, 1991

[30] Foreign Application Priority Data

May 22, 1990 [DE] Fed. Rep. of Germany ....... 4016416

[51] Int. Cl.$^5$ .......................................... C08K 5/5357
[52] U.S. Cl. .................................... 524/117; 524/119
[58] Field of Search ............... 525/500, 429, 136, 165, 525/138; 524/133, 126, 127, 139, 130, 141, 119, 117

[56] References Cited

U.S. PATENT DOCUMENTS

| | | | |
|---|---|---|---|
| 3,367,996 | 2/1968 | Strauss et al. | 525/138 |
| 3,409,571 | 11/1968 | Shepard et al. | 525/480 |
| 3,697,459 | 10/1972 | Dannels | 524/13 |
| 3,808,289 | 4/1974 | Okuhashi et al. | 525/429 |
| 3,953,394 | 4/1976 | Fox et al. | 525/165 |
| 4,010,144 | 3/1977 | Dannels et al. | 525/480 |
| 4,033,927 | 7/1977 | Borman | 525/165 |
| 4,105,825 | 8/1978 | Heath et al. | 524/511 |
| 4,988,748 | 1/1991 | Fuhr et al. | 524/141 |
| 5,102,931 | 4/1992 | Fuhr et al. | 524/126 |

FOREIGN PATENT DOCUMENTS

| | | |
|---|---|---|
| 0351648 | 1/1990 | European Pat. Off. |
| 0413167 | 2/1991 | European Pat. Off. |
| 56-72050 | 6/1981 | Japan |
| 63-90566 | 4/1988 | Japan |
| 1358080 | 6/1974 | United Kingdom |
| 1401863 | 8/1975 | United Kingdom |
| 1405983 | 9/1975 | United Kingdom |

*Primary Examiner*—Veronica P. Hoke
*Attorney, Agent, or Firm*—Connolly & Hutz

[57] ABSTRACT

The flameproofed, non-dripping polyalkylene terephthalate molding compounds according to the invention based on phosphoric acid esters may be used for the production of moldings. The fire behavior of the polyalkylene terephthalate molding compounds is improved by the addition of certain phosphoric acid esters, a surprising reduction in the phosphorus content of the molding compounds being achieved at the same time, particularly in combination with highly heat-resistant thermoplastics.

4 Claims, No Drawings

FLAMEPROOFED, NON-DRIPPING POLYALKYLENE TEREPHTHALATE MOLDING COMPOUNDS

This invention relates to flameproofed, non-dripping polyalkylene terephthalate molding compounds containing esters of acids of phosphorus and antidripping agents and, optionally, thermoplastics having a predominantly aromatic main chain and high heat resistance (Vicat B>180° C.), reinforcing materials and other additives.

DE-OS 2 458 967 describes flameproofed polyester molding compounds containing a polyalkylene terephthalate, which has binding units based on brominated aromatic compounds in the main chain, and high molecular weight organic phosphorus compounds. The polyester molding compounds described in DE-OS 2 458 967 have the disadvantage that they always contain organically bound bromine in co-condensed form and, because they are co-condensates, they are considerably more difficult to produce.

DE-OS 2 253 207 describes flameproofed thermoplastic polyester resin compositions containing aryl phosphonates as flameproofing agent. DE-OS 2 111 202 also describes flameproofed thermoplastic polyester molding compounds containing polyaryl phosphonates. However, the flame-retarding thermoplastic polyester molding compounds described in these two specifications only show the high degree of flame resistance (UL 94 classification V-O) required for industrial application in dosages which adversely affect other properties, including heat resistance.

DE-OS 2 132 350 describes phosphorus-containing flame-retardant polyalkylene terephthalate molding compounds containing both polyalkyl phosphonates and polyaryl phosphonates as phosphorus-containing additives. DE-OS 2 132 350 also claims polyester resin molding compounds of polypropylene terephthalate or polybutylene terephthalate containing reinforcing fillers, such as glass fibers, and polyphosphonate or polyphosphonate phosphate. Despite these phosphorus-containing additives, the reinforced polyalkylene terephthalate resin molding compounds do not show adequate flameproofing properties because the problem of dripping in the event of fire remains unsolved In addition, the flameproofed polyester molding compounds according to DE-OS 2 132 350 have the disadvantage that, to achieve the required UL-94 classification, they have to have a relatively high phosphorus content to the detriment of their heat resistance.

U.S. Pat. No. 3,697,459 and 4,010,144 describe novolaks partly esterified with phosphoric acid as impregnating agents for flame-retardant papers following the addition of hexamethylenediamine. U.S. Pat. No. 4,105,825 claims mixed phosphoric acid esters of novolaks and phenols as flameproofing agents for polyolefins, such as polyethylene, copolymers with polyethylene and blends thereof These polymers are crosslinked with peroxide and contain large quantities of fillers.

The present invention relates to flameproofed, non-dripping polyalkylene terephthalate molding compounds which, in addition to polyalkylene terephthalate, contain A) 5 to 30 parts by weight and preferably 10 to 25 parts by weight esters of acids of phosphorus corresponding to formula (I)

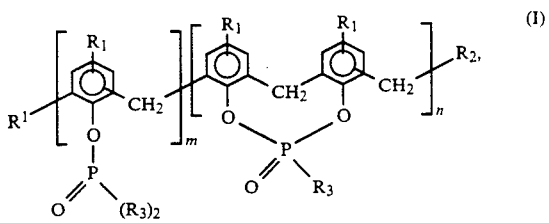

in which $R_1$ is hydrogen, $C_{1-8}$ alkyl, preferably methyl, $C_{7-12}$ aralkyl, preferably benzyl and 1-phenylethyl, and-/or optionally $C_{1-4}$-alkyl-substituted phenyl, preferably phenyl, $R_2$ represents

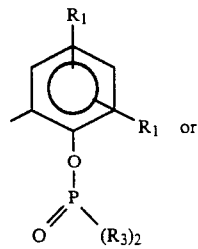

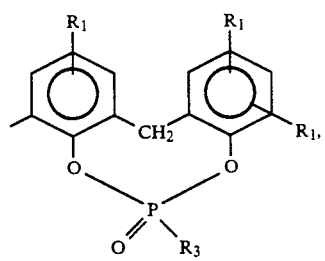

$R_3$ represents optionally $C_{1-4}$-alkyl , $C_{6-10}$-aryl- or $C_{7-12}$-aralkyl-substituted phenoxy, preferably phenoxy, and/or $C_{1-4}$ alkyl, preferably methyl and ethyl, and/or $C_{7-12}$ aralkyl, preferably benzyl and 1-phenylethyl, and/or optionally $C_{1-4}$-alkyl-substituted phenyl, preferably phenyl, m is 0 or an integer of 1 to 12 and preferably 3 to 8, n is 0 or an integer of 1 to 5 and preferably 1 to 3, with the proviso that, when m is 0, n is at least 1 and preferably 1 to 3 and $R_2$ represents (III), n is 0, m is at least 1 and preferably 2 to 8 and $R_2$ represents (II), and in which the number of phenyl nuclei in formula (I) is no greater than 12 and preferably from 3 to 8, and B) 0.01 to 2.0 parts by weight and preferably 0.2 to 0.8 part by weight of an anti-dripping agent, based on 100 parts by weight of the molding compounds.

In the context of the invention, the polyalkylene terephthalates are reaction products of aromatic dicarboxylic acid or reactive derivatives thereof, such as dimethyl esters or anhydrides, and aliphatic, cycloaliphatic or araliphatic diols and mixtures of these reaction products.

Preferred polyalkylene terephthalates contain at least 80% by weight and preferably at least 90% by weight, based on the dicarboxylic acid component, of terephthalic acid and at least 80% by weight and preferably at least 90% by weight, based on the diol component, of ethylene glycol and/or butane-1,4-diol units.

In addition to terephthalic acid units, the preferred polyalkylene terephthalates may contain up to 20 mol-% and preferably up to 10 mol-% units of other aromatic or cyclo aliphatic $C_{8-14}$ dicarboxylic acids or aliphatic $C_{4-12}$ dicarboxylic acids, for example units of phthalic acid, isophthalic, naphthalene-2,6-dicarboxylic acid, 4,4'-diphenyl dicarboxylic acid, succinic acid, adipic acid, sebacic acid, azelaic acid, cyclohexane diacetic acid.

In addition to ethylene glycol and butane-1,4-diol units, the preferred polyalkylene terephthalates may contain up to 20 mol-% and preferably up to 10 mol-% of other aliphatic $C_{3-12}$ diols or cycloaliphatic $C_{6-12}$ diols, for example units of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-($\beta$-hydroxyethoxy)-benzene,2,2-bis-(4-hydroxycyclohexyl)-propane, 2,4-dihydroxy-1,1,3,3-tetramethyl cyclobutane, 2,2-bis-(4-$\beta$-hydroxyethoxyphenyl)-propane and 2,2-bis-(4-hydroxypropoxyphenyl)-propane (DE-OS 2 407 674, 2 407 776, 2 715 932).

The polyalkylene terephthalates may be branched by incorporation of relatively small quantities of trihydric or tetrahydric alcohols or tribasic or tetrabasic carboxylic acids, for example in accordance with DE-OS 1 900 270 and US-PS 3,692,744. Examples of preferred branching agents are trimesic acid, trimellitic acid, trimethylol ethane and propane and pentaerythritol.

Polyalkylene terephthalates produced solely from terephthalic acid and reactive derivatives thereof (for example dialkyl esters) and ethylene glycol and/or butane1,4-diol and mixtures of these polyalkylene terephthalates are particularly preferred.

Preferred mixtures contain 1 to 50% by weight and preferably 1 to 30% by weight polyethylene terephthalate and 50 to 99% by weight and preferably 70 to 99% by weight polybutylene terephthalate.

The polyalkylene terephthalates preferably used generally have an intrinsic viscosity of 0.4 to 1.5 dl/g, preferably 0.5 to 1.3 dl/g and more preferably 0.6 to 1.2 dl/g, as measured in phenol/o-dichlorobenzene (1:1 parts by weight) at 25° C. using an Ubbelohde viscosimeter.

The polyalkylene terephthalates may be produced by known methods (cf. for example Kunststoff-Handbuch, Vol. VIII, pages 695 et sec., Carl-Hanser-Verlag, München 1973).

The phosphorus compounds (component A)) used in accordance with the invention are the phosphinic acid, phosphonic acid and phosphoric acid esters of bisphenols and novolaks (polyphenols). Ester mixtures are also possible. Since the acids of phosphorus according to the invention cannot be directly converted into the esters according to the invention, reactive derivatives have to be used. These reactive derivatives are acid chlorides and phenyl esters (prepared from the acid chlorides) which are reacted with the polyphenols to form the esters according to the invention on the one hand by elimination of hydrogen chloride and on the other hand, by elimination of phenol (transesterification).

The phosphinic acid esters used in accordance with the invention are the dialkyl, diaryl and alkylaryl phosphinic acid esters of bisphenols and polyphenols (novolaks). Examples of phosphinic acids are dimethyl phosphinic acid, methyl ethyl phosphinic acid, diethyl phosphinic acid, methyl phenyl phosphinic acid, ethyl phenyl phosphinic acid, diphenyl phosphinic acid, di-p-tolyl phosphinic acid and phenyl naphthyl -phosphinic acid and also 1-hydroxy-1-oxophospholine, 1-hydroxy-1-oxo-3-methyl -phospholine and 1-hydroxy-1-oxo-3,4-dimethyl phospholine.

Methods for the preparation of phosphinic acids and derivatives thereof, such as chlorides and phenyl esters, are known and are described in the literature (Houben-Weyl, Methoden der Organischen Chemie, Vol. XII/1. pp. 217–266, and Vol. E2, pp 123–221).

The reaction of the phosphinic acid chlorides with bisphenols and polyphenols takes place extremely slowly at temperatures of 180° to 200° C. with elimination of hydrogen chloride. In the presence of catalysts, such as magnesium chloride, it takes place more quickly and at lower temperatures. At relatively low temperatures, inert, high-boiling solvents have to be used in the esterification of novolaks for reasons of viscosity. Magnesium chloride or tertiary amines are normally used as catalysts Magnesium chloride is also used as catalyst in the much faster transesterification process where the temperatures are again 200° C.

The phosphonic acid esters used in accordance with the invention are the alkyl and aryl phosphonic acid esters of phenols and bisphenols or novolaks. Examples of phosphonic acids are methyl phosphonic acid, ethyl phosphonic acid, phenyl phosphonic acid, p-tolyl phosphonic acid and naphthyl phosphonic acid.

Methods for the preparation of phosphonic acids and derivatives thereof, such as chlorides and phenyl esters, are known and are described in the literature (Ullmanns Enzyclopädie der Technischen Chemie, 4th Edition, Vol. 18, pp 385–388, 1979, and Houben-Weyl, Methoden der Organischen Chemie, Vol. XII/1, pp. 423–525).

The phosphoric acid esters used in accordance with the invention are the phosphoric acid esters of bi-phenols or novolaks. They may generally be produced by known methods (U.S. Pat. No. 4,105,825; Ullmanns Enzyclopädie der Technischen Chemie, 4th Edition, Vol. 18, pp. 389–391, 1979, and Houben-Weyl, Methoden der Organischen Chemie, Vol. 12/1, pp. 299–374).

Suitable novolaks are condensation products of formaldehyde and phenols corresponding to general formula (IV)

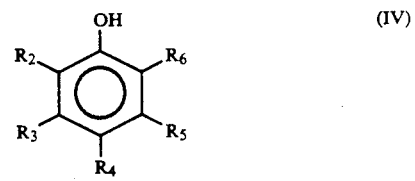

in which $R_2$ and $R_6$ may be hydrogen atoms and $R_3$, $R_4$ and $R_5$ may be hydrogen atoms, $C_{1-8}$ alkyl, aralkyl and/or aryl groups or in which $R_2$ and $R_4$ may be hydrogen atoms and $R_3$, $R_5$ and $R_6$ may have the meanings just defined. The aromatic radicals themselves may be substituted by $C_{1-8}$ alkyl groups.

Characteristic but by no means limiting examples of phenols are phenol, o-cresol, m-cresol, p-cresol, 2,5- dimethyl, 3,5-dimethyl, 2,3,5-trimethyl, 3,4,5-trimethyl, o-isopropyl, p-isopropyl, m-isopropyl, p-t-butyl, p-n-octylphenol and also benzyl, 1-phenyl ethyl and phenyl phenols.

Phenol, o-cresol, m-cresol, p-cresol, p-t-butyl phenol and p-octyl phenol are preferably used.

Mixtures of these phenols may also be used.

Accordingly, preferred novolaks are phenol/formaldehyde novolak, o-cresol/formaldehyde novolak, m-cresol/formaldehyde novolak, p-cresol/formaldehyde novolak, t-butylphenol/formaldehyde novolak and p-octylphenol/formaldehyde novolaks, although these are by no means the only novolaks which may be used in accordance with the invention.

p-Cresol/formaldehyde novolak is particularly preferred. The production of the novolaks is known (Houben-Weyl, Methoden der Organischen Chemie, Vol. XIV/2, pp. 193-292, and Ullmanns Enzyklopädie der Technischen Chemie, 4th Edition, Vol. 18, pp. 245-257).

To prepare the phosphonic acid and phosphoric acid esters, novolaks inter alia are reacted with diaryl esters of phosphonic acids or with triaryl esters of phosphoric acid by the so-called transesterification process or mixtures of novolaks and phenols are reacted with phosphonic acid chlorides or with phosphorus oxychloride by the so-called acid chloride process. In the transesterification process, methyl or phenyl phosphonic acid diphenyl ester or triphenyl phosphate are preferably used. In both processes, aryl and aralkylphenols, such as 4-phenylphenol, benzyl phenols, 1-phenyl ethyl phenols, 1-methyl-1-phenyl ethyl phenols and 2,4-di-(1-phenylethyl)-phenol, may be used as additional or other phenols.

A particular feature of the phosphonic and phosphoric acid esters of novolaks is that, in view of the polyfunctionality of the phosphonic acids and phosphoric acid and of novolaks, both open and also cyclic structures can occur, depending on whether one valency or two valencies of both molecules have reacted with one another. Crosslinking reactions attributable to the polyfunctionality of the reactants normally do not occur.

Phosphorus compounds of formula (I) suitable for the purposes of the invention are, for example, the reaction products of 1 mol triphenyl phosphate or phosphoric acid trichloride and 1 or 2 equivalents novolak. Quantitative ratios of 1 to 2 equivalents novolak are also possible. The third valency of the phosphoric acid is attached to phenol or to a substituted phenol, as explained above.

Tetrafluoroethylene polymers, colloidal silicon oxide and/or silicones may be used as component B). These compounds function as antidripping agents.

Tetrafluoroethylene polymers having fluorine contents of 65 to 76% by weight and preferably 70 to 76% by weight are preferably used for component B). Examples are inter alia polytetrafluoroethylene, tetrafluoroethylene/hexafluoropropylene copolymers, tetrafluoroethylene/difluoroethylene copolymers or tetrafluoroethylene copolymers containing small quantities of fluorine-free, copolymerizable, ethylenically unsaturated monomers. The polymers are known. They may be used in finely divided form, usually as powders. They may be produced by known methods, for example by polymerization of tetrafluoroethylene in aqueous medium in the presence of a catalyst forming free radicals, for example sodium, potassium or ammonium peroxydisulfate, under pressures of 7 to 71 kg/cm$^2$ and at temperatures of 0° to 200° C. and preferably at temperatures of 20° to 100° C. (for further particulars, see for example U.S. Pat. No. 2,393,967).

The polytetrafluoroethylenes suitable for the purposes of the invention should preferably have weight average molecular weights $\overline{M}_w$ of $10^5$ to $10^6$.

The tetrafluoroethylene polymers are preferably used in non-sintered form.

Thermoplastics, preferably those having a predominantly aromatic main chain and high heat resistance (Vicat B > 180° C.), may be another component of the flameproofed polyalkylene terephthalate molding compounds according to the invention. Examples of such thermoplastics are polysulfones, polyether sulfones, polyketones, polyether ketones, polyphenylene oxides and polyarylene sulfides. These thermoplastics may of course be used either individually or in admixture with one another; the particular mixing ratio may readily be determined by preliminary tests and is dependent on the purpose for which the molding compounds according to the invention are to be used. These thermoplastics are known from the literature and may be produced by known methods.

The thermoplastics mentioned may be used in quantities of up to 30% by weight although they are preferably used in a quantity of 1 to 28% by weight and, more preferably, in a quantity of 3 to 25% by weight.

The addition, any known reinforcing materials and polymer additives or auxiliaries may be added to the molding compounds according to the invention. The quantity in which the additives are used depends upon the particular purpose for which the polymer molding compounds are intended. The most favorable quantity may readily be determined by preliminary tests. Suitable additives are inorganic fillers, reinforcing materials, pigments and/or crystallization aids, other flameproofing agents, such as nitrogen, halogen and/or other phosphorus compounds, processing aids, such as mold release agents, stabilizers, flow aids, UV, light and heat stabilizers, known high-impact modifiers and/or compatibility promoters.

The inorganic fillers, reinforcing materials and/or pigments are normally used in quantities of from about 3 to 40 parts by weight and preferably in quantities of from 5 to 30 parts by weight. The other flameproofing agents mentioned and the known high-impact modifiers and/or compatibility promoters are added in quantities of from about 1 to 20 parts by weight and preferably in quantities of 3 to 15 parts by weight. The crystallisation aids, UV, light, heat stabilizers, mold release agents, flow aids and colorants are added in quantities of from 0.1 to 5 parts by weight and preferably in quantities of 0.5 to 3 parts by weight. All quantity details are based on 100 parts by weight of the molding compounds.

The reinforcing materials optionally used include any of the known materials used to reinforce polyalkylene terephthalates, such as for example glass fibers, glass beads and/or mineral fillers, as described for example in Katz and Milewski, "Handbook of Fillers and Reinforcements for Plastics", Nostrand-Verlag, 1978. Glass fibers are preferably used as inorganic reinforcing materials. The glass fibers used generally have a diameter of from about 6 to 15 μm and preferably from 8 to 13 μm and a length-to-thickness ratio of greater than 45 and preferably from 50 to 200.

Other suitable fillers, reinforcing materials and pigments are microglass beads, carbon fibers, chalk, other alkaline earth metal carbonates, alkaline earth metal oxides, quartz such as novaculite, silicates such as asbestos, feldspar, mica, talcum, wollastonite and kaolin in calcined and non-calcined form; titanium dioxide and/or zinc sulfide. The mineral fillers used have average particle diameters of less than 20 μm, preferably less than 10 μm and more preferably from 2 to 8 μm. They may be suitably surface-modified, for example treated with silanes.

Suitable crystallization aids are, for example, inorganic crystalline, high-melting compounds which act as nucleating agents, such as microtalcum, metal salts of aliphatic and/or aromatic low molecular weight or high molecular weight carboxylic acids, as described in WO 85/03717, EP 0 029 285, EP 0 037 666, EP 0 034 773, EP 0 112 167, EP 0 021 648, EP 0 102 768, and also metal salts of aliphatic and/or aromatic sulfonic acids (EP 178 807).

Suitable other flameproofing agents are brominecontaining compounds, such as hexabromobenzene, pentabromotoluene, octa- and decabromodiphenyl, hexabromo-bis-phenoxyethane, ethylene-bis-tetrabromophthalimide and mixtures thereof and also brominated polystyrenes (Pyro-Check types from the Ferro Corp., USA), brominated polyphenylene oxide (PO-64 P, a product of Great Lakes Chem. Corp., USA). Organic phosphorus compounds, such as phosphates and phosponates, are particularly suitable for the flameproofing combinations. Aromatic phosphates, for example triphenyl phosphate and dicresyl phenyl phosphate, and phosphonates, such as diphenyl methyl phosphonate, dicresyl phosphonate, are preferred.

Metal oxides, for example antimony(III) oxide, lead-(IV) oxide, cerium(IV) oxide, copper(II) oxide, molybdenum(VI) oxide, vanadium(V) oxide, bismuth(III) oxide, tungsten(VI) oxide, tin(IV) oxide and zirconium-(IV) oxide, zinc borate (hydrates) and mixtures thereof may be added as further flameproofing agents.

Known mold release agents, stabilizers, flow aids, may be added to the molding compounds according to the invention as processing aids. Suitable mold release agents are ester waxes, for example montan wax, amide wax, such as Rhenax®, and/or oligoethylenes. Suitable plasticizers are, for example, aliphatic oligomeric polyesters (cf. EP 29 931 and DE 2 706 128).

Suitable high-impact modifiers are, in particular, rubbers, such as butadiene/acrylonitrile copolymers, butadiene/styrene copolymers, butadiene/isoprene and butadiene/styrene block copolymers, alkyl acrylate rubbers, EP and EPDM rubber systems and also silicone rubbers. Graft rubbers in which vinyl homopolymers or copolymers are grafted onto one of the rubber systems mentioned above, of which the glass temperature should be below −10° C., are preferably used as the rubber component.

The blends of thermoplastic polyalkylene terephthalate, phosphorus compounds, antidripping agents and optionally thermoplastics having a predominantly aromatic main chain and high heat resistance (Vicat B>180° C.), reinforcing materials and processing aids may be produced in typical mixing units, such as mixing rolls, kneaders, single-screw and multiscrew extruders. The processing aids may be added as concentrates to thermoplastic polyesters in the form of granules or a powder blend during the compounding of the components.

The production process may be carried out both discontinuously and continuously under conditions which largely preclude oxidation, i.e. in an inert gas atmosphere. Suitable inert gases are, for example, nitrogen, carbon dioxide and/or argon.

The thermoplastic molding compounds according to the invention may be processed to moldings at melt temperatures up to 40° C. above the melting point of the polyester (250° to 290° C.) and with melt residence times of up to 9 minutes (1 to 9 minutes). Preferred processing conditions are those in which the melt temperatures are no higher than 270° C. and the melt residence times are no longer than 9 minutes. Under the particularly preferred processing conditions, the melt temperatures are no higher than 260° C. while the melt standing times are no longer than 6 minutes.

The polymer blends may optionally be subjected to a thermal aftertreatment in the solid phase at temperatures of 100° to 200° C. and preferably at temperatures of 180° to 210° C.

The flameproofed polyalkylene terephthalate molding compounds according to the invention may be used for the production of moldings of all kinds, fibers or films.

By combining the highly heat-resistant thermoplastics to be added with the esters of phosphorus-containing acids, the phosphorus content of the compounds can be considerably reduced. This is all the more surprising insofar as the required flame resistance (for example under the UL-94 classification) is not achieved solely by adding highly heat-resistant thermoplastics of the type mentioned to polyalkylene terephthalates. Accordingly, it had been expected that a combination of the highly heat-resistant thermoplastics with the phosphorus compounds mentioned would not go beyond the flameproofing effect of the phosphorus compounds. It was all the more surprising to find that a synergistic effect in regard to high flame resistance (UL-94 V-O) of the polymer compounds is achieved in such a combination, despite reduced phosphorus contents (see Examples).

A. Component used

I. Polyethylene terephthalate having an intrinsic viscosity of 1.20 dl/g, as measured in a mixture of phenol and o-dichlorobenzene (ratio by weight 1:1), 25° C., Ubbelohde viscosimeter (granules), II. Polybutylene terephthalate having an intrinsic viscosity of 1.20 dl/g, determined as described in I. (granules), III. Phosphinic acid ester of 1- chloro-1-oxo-3-methyl phospholine and 4,4'-dihydroxydiphenyl methane (molar ratio 1:2), IV. Phosphinic acid ester of methylethyl phosphinic acid chloride and a novolak of p-cresol and formaldehyde, number of phenol nuclei approx. 5, V. Phosphinic acid ester of 1-chloro-1-oxo-3-methyl phospholine and the same novolak as in IV., VI. Phosphonic acid ester of 1 mol methyl phosphonic acid diphenyl ester and 1 equivalent of the same novolak as in IV., VII Phosphonic acid ester of 1 mol methyl phosphonic acid diphenyl ester and 1.5 equivalents of the same novolak as in IV., VIII. Phosphonic acid ester of 1 mol methyl phosphonic acid diphenyl ester and 2 equivalents of the same novolak as in IV., IX. Phosphoric acid ester of 1 mol triphenyl phosphate and 1 equivalent of the same novolak as in IV., X. Phosphoric acid ester of 1 mol triphenyl phosphate and 1.5 equivalents of the same novolak as in IV., XI. Phosphoric acid ester of 1 mol triphenyl phosphate and 2 equivalents as the same novolak as in IV., XII Polyphenylene sulfide, unconditioned material, free from additives, melt flow: 4,000 to 6,000 g/10 mins. (melting flow index MFI according to ASTM D 1238, determined at 316° C. under a load of 5 kg), XIII. Polyether sulfone of 4,4'-dihydroxydiphenyl sulfone and 4,4'-dichlorodiphenyl sulfone having an intrinsic viscosity of 0.38 dl/g, as measured in dimethyl formamide, 25° C., Ubbelohde viscosimeter, XIV. Polytetrafluoroethylene powder, Hostaflon TF 2027 (a product of Hoechst AG), XV. Chopped strands (type OCF 429 YZ of Owens Corning, Italy)

XVI. E wax (powder-form),

XVII. Barium sulfate, Blanc fix micro, a product of Sachtleben AG,

XVIII. Oligomeric carbonate of tetrabromobisphenol A, Great Lakes BC-52-HP, a product of Great Lakes Chem. Corp., USA, XIX. Bromine-containing polymer, F-2400 (a product of Makhteshim Ltd., Israel).

B. Production of the phosphorus additives used

1 Phosphinic acid ester of 1-chloro-1-oxo-3-methyl phospholine and bisphenol F (4,4'-dihydroxydiphenylmethane)

200.2 g (1 mol) bisphenol F are heated under nitrogen to 170°-180° C. in a 1 liter flask equipped with a heating bath, stirrer, gas inlet pipe for nitrogen, dropping funnel and reflux condenser. 301.1 g (2 mol) 1-chloro-1-oxo-3-methyl phospholine are then added dropwise over a period of 2 hours. The evolution of hydrogen chloride stops after 18 hours.

After cooling, the ester is taken up while still hot in 1 l methylene chloride and washed with water until free from chloride. After drying of the methylene chloride solution, the sodium sulfate is filtered off and the solution is concentrated. The yield comprises 397.1 g=88.5% of the theoretical. The product is resin-like and has a phosphorus content of 13.8% (theoretical 14.5%) and an OH value of <10.

2. Phosphinic acid ester of methyl ethyl phosphinic acid chloride and a novolak of p-cresol 239.7 g (2 gram equivalents) of a novolak of p-cresol and formaldehyde (OH value 468, approx. 5 nuclei) and 5.7 g (0.06 mol) magnesium chloride are heated under nitrogen to 190°-200° C. in a 2 liter flask equipped with a heating bath, stirrer, gas inlet pipe for nitrogen, dropping funnel and reflux condenser. 253.1 g (2 mol) methyl ethyl phosphinic acid chloride are then added dropwise over a period of 1 hour. The evolution of hydrogen chloride stops after 72 hours.

After cooling, the ester is taken up while still hot in 2 l methylene chloride and washed with water until free from chloride. After drying of the methylene chloride solution, the sodium sulfate is filtered off and the solution is concentrated. The yield comprises 402.4 g=95.8% of the theoretical. Softening begins at 98° C. (Kofler heating bench). The product has a phosphorus content of 13.4% (theoretical 14.7%) and an OH value of 0.

3. Phosphinic acid ester of 1-chloro-1-oxo-3-methyl phospholine and a novolak of p-cresol 240.3 g (2 gram equivalents) of a novolak of p-cresol and formaldehyde (OH value 468, approx. 5 nuclei) and 301.1 g (2 mol) 1-chloro-1-oxo-3-methyl phospholine are reacted in the same way as in 2. The reaction mixture is also worked up in the same way as in 2.

The yield comprises 437.1 g=93.3% of the theoretical. Softening begins at 136° C. The product has a phosphorus content of 12.6% (theoretical 13.2%) and an OH value of 0.

4. Phosphonic acid ester of 1 mol methyl phosphonic acid diphenyl ester and 1 equivalent novolak (from p-cresol, approx. 5 nuclei)

After melting, 1,241.1 g (5 mol) methyl phosphonic acid diphenyl ester, 615.2 g (5 gram equivalents) of a novolak of p-cresol and formaldehyde (OH value 456, approx. 5 nuclei) and 2.5 ml of a 1% titanium tetrabutylate solution in chlorobenzene are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 504.4 g product (OH value 541) are then distilled off via the column and condenser over a period of 3 hours at temperatures of 190°-210° C. and under a vacuum falling from 300 to 3 mbar (5 mol phenol: 470.6 g). The reaction product is then heated for 1 h at 210° C. under a vacuum of 3 mbar.

After cooling, the reaction product is taken up in 4 l methylene chloride and washed with water until free from chloride. After drying with sodium sulfate, the methylene chloride solution is filtered and concentrated. The yield comprises 1,327.4 g=95.8% of the theoretical. The product is resin-like and has a phosphorus content of 10.7% (theoretical 11.2%) and an OH value of 0.

5. Phosphonic acid ester of 1 mol methyl phosphonic acid diphenyl ester and 1.5 equivalent novolak (from p-cresol, approx. 5 nuclei)

After melting, 992.9 g (4 mol) methyl phosphonic acid diphenyl ester, 738.2 g (6 gram equivalents) of a novolak of p-cresol and formaldehyde (OH value 456, approx. 5 nuclei) and 2.0 ml of a 1% titanium tetrabutylate solution in chlorobenzene are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 573.2 g product (OH value 586) are then distilled off via the column and condenser over a period of 3.5 hours at temperatures of 190°-210° C. and under a vacuum falling from 300 to 3 mbar (6 mol phenol: 564.6 g). The reaction product is then heated for 1 h at 220° C. under a vacuum of 3 mbar.

After cooling, the reaction product is taken up in 4 l methylene chloride and washed with water until free from chloride. After drying with sodium sulfate, the methylene chloride solution is filtered and concentrated. The yield comprises 1,100.0 g=94.3% of the theoretical. The product begins to soften at 106° C. (Kofler heating bench) and has a phosphorus content of 10.1% (theoretical 10.6%) and an OH value of 0.

6. Phosphonic acid ester of 1 mol methyl phosphonic acid diphenyl ester and 2 equivalents novolak (from p-cresol, approx. 5 nuclei)

After melting, 868.8 g (3.5 mol) methyl phosphonic acid diphenyl ester, 861.2 g (7 gram equivalents) of a novolak of p-cresol and formaldehyde (OH value 456, approx. 5 nuclei) and 2 ml of a 0.5% titanium tetrabutylate solution in chlorobenzene are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 649.9 g product (OH value 586) are then distilled via the column and condenser off over a period of 4 hours at temperatures of 190°–210° C. and under a vacuum falling from 300 to 3 mbar (7 mol phenol: 658.7 g). The reaction product is then heated for 1 h at 220° C. under a vacuum of 3 mbar.

After cooling, the reaction product is taken up in 4 l methylene chloride and washed with water until free from chloride. After drying with sodium sulfate, the methylene chloride solution is filtered and concentrated. The yield comprises 1,032.7 g=96.4% of the theoretical. The product begins to soften at 166° C. (Kofler heating bench) and has a phosphorus content of 10.1% (theoretical 10.0%) and an OH value of 4.

7. Phosphoric acid ester of 1 mol triphenyl phosphate and 1 equivalent novolak (from p-cresol, approx. 5 nuclei)

After melting, 1,631.5 g (5 mol) triphenyl phosphate, 599.5 g (5 gram equivalents) of a novolak of p-cresol and formaldehyde (OH value 468, approx. 5 nuclei) and 14.3 g magnesium chloride (0.15 mol) are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 482.5 g product (OH value 583) are then distilled off via the column and condenser over a period of 3 hours at temperatures of 200°–210° C. and under a vacuum falling from 300 to 3 mbar (5 mol phenol: 470.6 g). The reaction product is then heated for 1 h at 210° C. under a vacuum of 3 mbar.

After cooling, the reaction product is taken up in 4 l methylene chloride and washed with water until free from chloride. After drying with sodium sulfate, the methylene chloride solution is filtered and concentrated. The yield comprises 1,693.7 g=96.2% of the theoretical. The product is resin-like and has a phosphorus content of 8.9% (theoretical 8.8%) and an OH value of 4.

8. Phosphoric acid ester of 1 mol triphenyl phosphate and 1.5 equivalents novolak (from p-cresol, approx. 5 nuclei)

After melting, 1305.2 g (4 mol) triphenyl phosphate, 719.4 g (6 gram equivalents) of a novolak of p-cresol and formaldehyde (OH value 468, approx. 5 nuclei) and 11.4 g magnesium chloride (0.12 mol) are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 580.4 g product (OH value 578) are then distilled off via the column and condenser over a period of 3.5 hours at temperatures of 200°–210° C. and under a vacuum falling from 300 to 3 mbar (6 mol phenol: 564.6 g). The reaction product is then heated for 1 h at 210° C. under a vacuum of 3 mbar. After cooling, the reaction product is taken up in 4 l methylene chloride and washed with water until free from chloride. After drying with sodium sulfate, the methylene chloride solution is filtered and concentrated. The yield comprises 1,378.6 g=94.3% of the theoretical. The product begins to soften at 72° C. (Kofler heating bench) and has a phosphorus content of 9.0% (theoretical 8.5%) and an OH value of 0.

9. Phosphoric acid ester of 1 mol triphenyl phosphate and 2 equivalents novolak (from p-cresol, approx. 5 nuclei)

After melting, 1142.0 g (3.5 mol) triphenyl phosphate, 839.3 g (7 gram equivalents) of a novolak of p-cresol and formaldehyde (OH value 468, approx. 5 nuclei) and 10.0 g magnesium chloride (0.09 mol) are heated at 200° C. for 0.5 h under a vacuum of 300 mbar in a 4 liter flask equipped with a controllable mushroom heating hood, capillary and short Vigreux column with a descending condenser. The stream of nitrogen introduced through the capillary ensures thorough mixing. 681.7 g product (OH value 550) are then distilled off via the column and condenser over a period of 4 hours at temperatures 200°–210° C. and under a vacuum falling from 300 to 3 mbar (7 mol phenol: 658.7 g). The reaction product is then heated for 1 h at 210° C. under a vacuum of 3 mbar. After cooling, the reaction product is taken up in 4 l methylene chloride and washed with water until free from chloride. After drying with sodium sulfate, the methylene chloride solution is filtered and concentrated. The yield comprises 1,304.7 g=98.6% of the theoretical. The product begins to soften at 141° C. (Kofler heating bench) and has a phosphorus content of 8.2% (theoretical 8.2%) and an OH value of 0.

C. Production, processing and testing of the molding compounds

The components used in the quantities shown in Table 1 are melted, mixed and extruded to strands in a twin-screw extruder and then granulated. The molding compounds may be produced, for example, in a Werner & Pfleiderer ZSK 32 twin-screw extruder at melt temperatures of 270° to 280° C., at a screw speed of 130 r.p.m. and at a throughput of 8 kg/h.

After adequate drying (for example 3 to 4 h at 120° C.), the molding compounds are injection-molded to test specimens (standard test bars) in standard injection-molding machines at melt temperatures of 250° to 270° C., at a mold temperature of 80° to 130° C. and with a melt residence time of no longer than 9 minutes and then subjected to the following tests:
determination of phosphorus content (elemental analysis, %P),
evaluation of dripping behavior,
Underwriters' Laboratories fire test UL-94.
The test results obtained are shown in Table 2.

TABLE 1

| Component | I. | II. | III. | IV. | V. | XII. | XIII. | XIV. | XV. | XVI. | XVII. | XVIII. | XIX. |
|---|---|---|---|---|---|---|---|---|---|---|---|---|---|
| Example 1 | 64.8 | | 12.5 | | | | | 0.4 | 20.0 | 0.3 | 2.0 | | |
| Example 2 | 64.8 | | | 12.5 | | | | 0.4 | 20.0 | 0.3 | 2.0 | | |
| Example 3 | 64.8 | | | | 12.5 | | | 0.4 | 20.0 | 0.3 | 2.0 | | |
| Example 4 | 57.3 | | | | 10.0 | 10.0 | | 0.4 | 20.0 | 0.3 | 2.0 | | |
| Example 5 | 57.3 | | | | 10.0 | | 10.0 | 0.4 | 20.0 | 0.3 | 2.0 | | |
| Example 6 | 61.3 | | | | 10.0 | | | 0.4 | 20.0 | 0.3 | 2.0 | 6.0 | |
| Example 7 | 59.8 | | | | 10.0 | | | 0.4 | 20.0 | 0.3 | 2.0 | | 7.5 |
| Example 8 | | 57.3 | | | 10.0 | 10.0 | | 0.4 | 20.0 | 0.3 | | | |

TABLE 1-continued

| Component | I. | II. | III. | IV. | V. | XII. | XIII. | XIV. | XV. | XVI. | XVII. | XVIII. | XIX. |
|---|---|---|---|---|---|---|---|---|---|---|---|---|---|
| Example 9 |  | 57.3 |  |  | 10.0 |  | 10.0 | 0.4 | 20.0 | 0.3 |  |  |  |
| Example 10 |  | 57.3 |  |  | 10.0 |  |  | 0.4 | 20.0 | 0.3 |  | 10.0 |  |
| Example 11 |  | 55.3 |  |  | 10.0 |  |  | 0.4 | 20.0 | 0.3 |  |  | 12.0 |
| Example 12 |  | 52.3 |  |  | 10.0 |  | 10.0 | 0.4 | 20.0 | 0.3 |  | 5.0 |  |
| Example 13 | 62.3 |  | 15.0 |  |  |  |  | 0.4 | 20.0 | 0.3 | 2.0 |  |  |
| Example 14 | 62.3 |  |  | 15.0 |  |  |  | 0.4 | 20.0 | 0.3 | 2.0 |  |  |
| Example 15 | 62.3 |  |  |  | 15.0 |  |  | 0.4 | 20.0 | 0.3 | 2.0 |  |  |
| Example 16 | 57.3 |  |  |  | 10.0 | 10.0 |  | 0.4 | 20.0 | 0.3 | 2.0 |  |  |
| Example 17 | 57.3 |  |  |  | 10.0 |  | 10.0 | 0.4 | 20.0 | 0.3 | 2.0 |  |  |
| Example 18 | 61.3 |  |  |  | 10.0 |  |  | 0.4 | 20.0 | 0.3 | 2.0 | 6.0 |  |
| Example 19 | 59.8 |  |  |  | 10.0 |  |  | 0.4 | 20.0 | 0.3 | 2.0 |  | 7.5 |
| Example 20 |  | 54.3 | 15.0 |  |  | 10.0 |  | 0.4 | 20.0 | 0.3 |  |  |  |
| Example 21 |  | 54.3 |  | 15.0 |  | 10.0 |  | 0.4 | 20.0 | 0.3 |  |  |  |
| Example 22 |  | 54.3 |  |  | 15.0 | 10.0 |  | 0.4 | 20.0 | 0.3 |  |  |  |
| Example 23 |  | 57.3 | 10.0 |  |  |  |  | 0.4 | 20.0 | 0.3 |  | 12.0 |  |
| Example 24 |  | 57.3 |  |  | 10.0 |  |  | 0.4 | 20.0 | 0.3 |  | 12.0 |  |
| Example 25 |  | 53.3 |  |  | 10.0 |  | 10.0 | 0.4 | 20.0 | 0.3 |  | 6.0 |  |
| Example 26 | 62.3 |  | 15.0 |  |  |  |  | 0.4 | 20.0 | 0.3 | 2.0 |  |  |
| Example 27 | 62.3 |  |  | 15.0 |  |  |  | 0.4 | 20.0 | 0.3 | 2.0 |  |  |
| Example 28 | 62.3 |  |  |  | 15.0 |  |  | 0.4 | 20.0 | 0.3 | 2.0 |  |  |
| Example 29 | 57.3 |  |  |  | 10.0 | 10.0 |  | 0.4 | 20.0 | 0.3 | 2.0 |  |  |
| Example 30 | 57.3 |  |  |  | 10.0 |  | 10.0 | 0.4 | 20.0 | 0.3 | 2.0 |  |  |
| Example 31 | 61.3 |  |  |  | 10.0 |  |  | 0.4 | 20.0 | 0.3 | 2.0 | 6.0 |  |
| Example 32 | 59.8 |  |  |  | 10.0 |  |  | 0.4 | 20.0 | 0.3 | 2.0 |  | 7.5 |
| Example 33 |  | 49.4 | 20.0 |  |  | 10.0 |  | 0.4 | 20.0 | 0.3 |  |  |  |
| Example 34 |  | 49.4 |  | 20.0 |  | 10.0 |  | 0.4 | 20.0 | 0.3 |  |  |  |
| Example 35 |  | 49.4 |  |  | 20.0 | 10.0 |  | 0.4 | 20.0 | 0.3 |  |  |  |
| Example 36 |  | 49.4 | 15.0 |  |  |  |  | 0.4 | 20.0 | 0.3 |  | 12.0 |  |
| Example 37 |  | 57.3 |  |  | 15.0 |  |  | 0.4 | 20.0 | 0.3 |  | 12.0 |  |
| Example 38 |  | 53.3 |  |  | 15.0 |  | 10.0 | 0.4 | 20.0 | 0.3 |  | 6.0 |  |

TABLE 2

Test Results

| | % by weight phosphorus | Dripping behavior | Fire behavior UL-94/1.6 mm |
|---|---|---|---|
| Example 1 | 1.7 | does not drip | V-O |
| Example 2 | 1.7 | does not drip | V-O |
| Example 3 | 1.6 | does not drip | V-O |
| Example 4 | 1.3 | does not drip | V-O |
| Example 5 | 1.3 | does not drip | V-O |
| Example 6 | 1.3 | does not drip | V-O |
| Example 7 | 1.3 | does not drip | V-O |
| Example 8 | 1.3 | does not drip | V-O |
| Example 9 | 1.3 | does not drip | V-O |
| Example 10 | 1.3 | does not drip | V-O |
| Example 11 | 1.3 | does not drip | V-O |
| Example 12 | 1.3 | does not drip | V-O |
| Example 13 | 1.6 | does not drip | V-O |
| Example 14 | 1.5 | does not drip | V-O |
| Example 15 | 1.5 | does not drip | V-O |
| Example 16 | 1.0 | does not drip | V-O |
| Example 17 | 1.0 | does not drip | V-O |
| Example 18 | 1.0 | does not drip | V-O |
| Example 19 | 1.0 | does not drip | V-O |
| Example 20 | 1.6 | does not drip | V-O |
| Example 21 | 1.5 | does not drip | V-O |
| Example 22 | 1.5 | does not drip | V-O |
| Example 23 | 1.1 | does not drip | V-O |
| Example 24 | 1.0 | does not drip | V-O |
| Example 25 | 1.0 | does not drip | V-O |
| Example 26 | 1.6 | does not drip | V-O |
| Example 27 | 1.5 | does not drip | V-O |
| Example 28 | 1.5 | does not drip | V-O |
| Example 29 | 1.0 | does not drip | V-O |
| Example 30 | 1.0 | does not drip | V-O |
| Example 31 | 1.0 | does not drip | V-O |
| Example 32 | 1.0 | does not drip | V-O |
| Example 33 | 1.6 | does not drip | V-O |
| Example 34 | 1.5 | does not drip | V-O |
| Example 35 | 1.5 | does not drip | V-O |
| Example 36 | 1.1 | does not drip | V-O |
| Example 37 | 1.0 | does not drip | V-O |
| Example 38 | 1.0 | does not drip | V-O |

It can be seen from Examples 1 to 38 of Tables 1 and 2 that the mixture according to the invention containing phosphinic, phosphonic and phosphoric acid esters of bisphenols and novolaks, antidripping agents and, optionally, thermoplastics having a predominantly aromatic main chain and high heat resistance (Vicat B ≧ 180° C.) provides the thermoplastic polyesters with a UL-94 classification of V-O for 1.6 mm thick test specimens.

The use of thermoplastics having a predominantly aromatic main chain and high heat resistance (Vicat B ≧ 180° C.) allows an overproportional reduction in the quantities of phosphorus-containing compounds according to the invention required to achieve the UL-94 V-O classification (1.6 mm).

The use of halogen compounds enables the quantity of phosphorus-containing esters according to the invention required to achieve the V-O classification (1.6 mm) to be further reduced.

We claim:

1. Flameproofed, non-dripping polyalkylene terephthalate molding compounds which, in addition to polyalkylene terephthalate, contain
   A. 5 to 30 parts by weight esters of acids of phosphorus corresponding to formula (I)

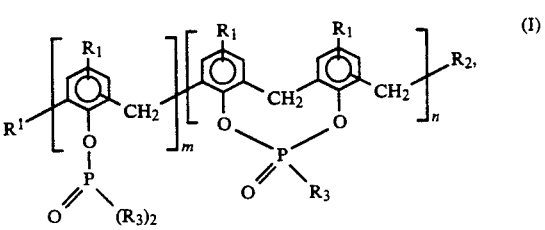

in which
$R_1$ is hydrogen, $C_{1-8}$ alkyl, $C_{7-12}$ aralkyl and/or optionally $C_{1-4}$-alkyl-substituted phenyl,
$R_2$ represents

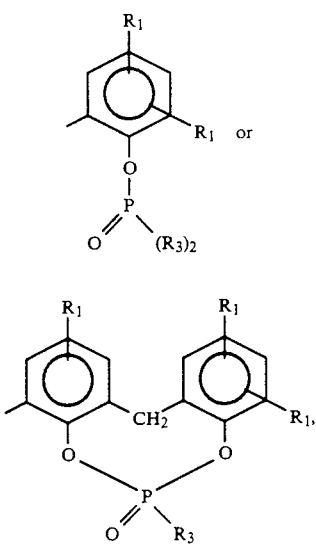

$R_3$ represents optionally $C_{1-4}$-alkyl-, $C_{8-10}$-aryl- or $C_{7-12}$-aralkyl-substituted phenoxy, $C_{1-4}$ alkyl, $C_{7-12}$ aralkyl and/or optionally $C_{1-4}$-alkyl-substituted phenyl, m is 0 or an integer of 1 to 12,
n is 0 or an integer of 1 to 5,
with the proviso that, when
m is 0, n is at least 1 and $R_2$ represents (III),
n is 0, m is at least 1 and $R_2$ represents (II), and in which the number of phenyl nuclei of the novolak of formula (I) is no higher than 12,
and
B) 0.01 to 2.0 parts by weight of an anti-dripping agent.

2. Flameproofed polyalkylene terephthalate molding compounds as claimed in claim I, characterized in that tetrafluoroethylene polymers are used as the antidripping agents.

3. Flameproofed polyalkylene terephthalate molding compounds as claimed in claim 1, characterized in that the molding compounds contain polysulfones, polyether sulfones, polyketones, polyether ketones, polyphenylene oxides and/or polyarylene sulfides.

4. An article molded from a polymeric molding composition which comprises the flameproofed polyalkylene terephthalate molding compound as claimed in claim 1.

* * * * *